Dec. 27, 1938.    R. R. ROBERTSON    2,141,559
EXPANSION JOINT WITH PERIPHERAL SEAL
Filed Oct. 5, 1936
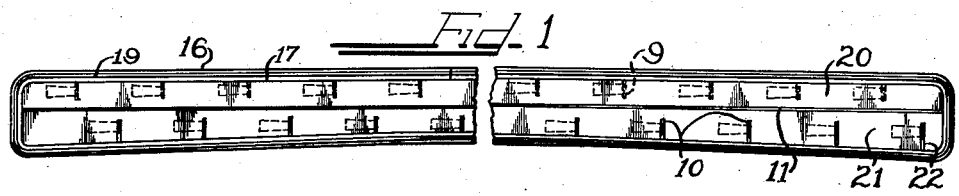
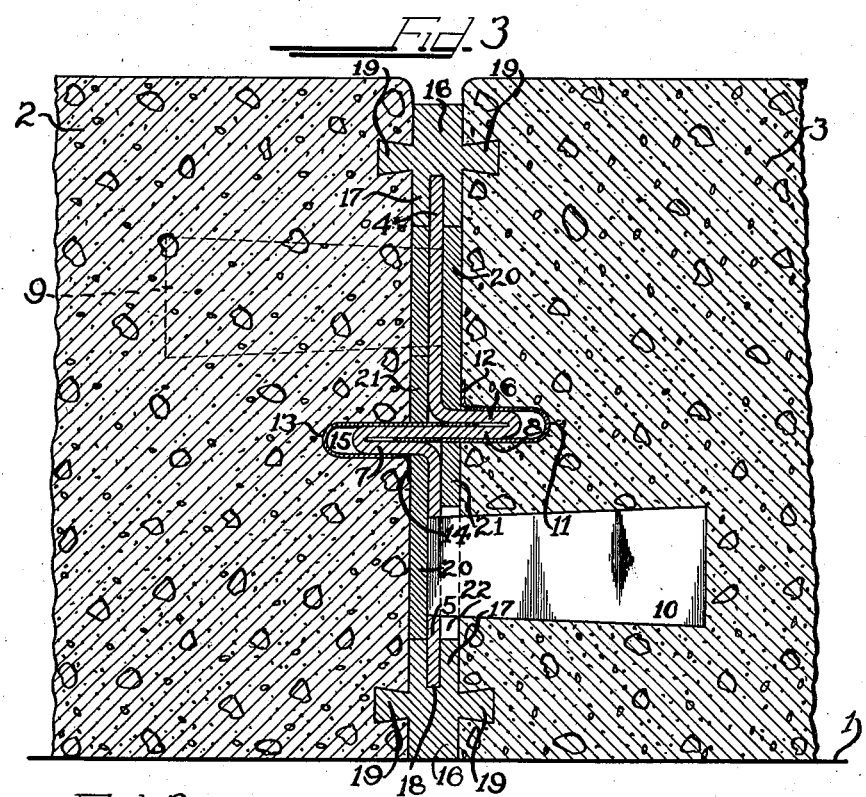
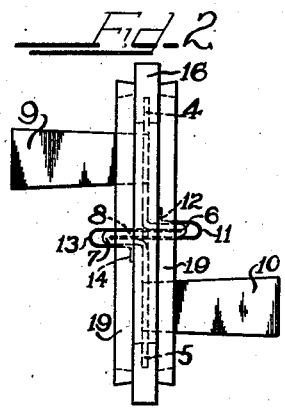
Inventor
ROBERT R. ROBERTSON Patented Dec. 27, 1938

2,141,559

UNITED STATES PATENT OFFICE 2,141,559

EXPANSION JOINT WITH PERIPHERAL SEAL

Robert R. Robertson, Chicago, Ill., assignor to The Translode Joint Company, Chicago, Ill., a corporation of Illinois Application October 5, 1936, Serial No. 103,995

10 Claims. (Cl. 94—18)

This invention relates to a road expansion joint and more particularly to an expansion joint provided with a compressible and expansible peripheral seal which engages over the top, bottom and end margins of an expansion joint body plate having preformed non-extruding and compressible joint boards positioned on opposite sides of the body plate and also surrounded by means of the peripheral seal forming part of the expansion joint.

It is an object of this invention to provide an expansion joint in the form of a joint plate formed with anchoring members and enclosed between specially treated compressible boards which are in contact with the inner periphery of a peripheral seal engaged around the margins of the joint plate and formed with anchoring ribs adapted to be embedded in adjacent concrete road sections between which the expansion joint mechanisms are embedded.

It is also an object of this invention to provide an expansion joint wherein a body plate is provided with anchoring members and wherein the anchoring plate has positioned on opposite sides thereof compressible boards, the exposed edges of which together with the edges of the body plate, are enclosed by means of a peripheral seal slotted to engage over the margins of the joint plate and seat against the exposed edges of the expansion joint boards.

A further object of the invention is to provide an expansion joint with a peripheral seal, with the body portion of the expansion joint consisting of a metal plate formed with a transverse shielded section and enclosed between expansion joint boards positioned on opposite sides of the plate and on opposite sides of the shield portion of plate.

It is furthermore an object of this invention to provide a road expansion joint mechanism provided with a preformed continuous peripheral seal surrounding a body portion consisting of layers of compressible material separated by non-compressible means.

It is also an object of this invention to provide a road expansion joint mechanism provided with a pre-cast continuous peripheral seal provided with anchoring members adapted to be embedded in the concrete of adjacent road slabs thereby forming a seal continuously around the expansion joint to enclose a body portion constructed of non-compressible material provided with anchoring members for embedding in the concrete road slabs with said body portions having the side surfaces thereof protected by means of joint boards constructed of specially treated compressible material providing a mechanism which is adapted to be compressed or expanded with the respective expansion and contraction of the concrete road slabs due to temperature changes.

It is an important object of this invention to provide a road expansion joint mechanism provided with a preformed continuous peripheral seal having anchoring members formed on the sides thereof, with said seal surrounding the edges of the body portion of the joint mechanism which consists of a metal body plate having the intermediate portion thereof formed to provide a transverse seal equipped with covers or caps, said metal body plate having anchoring members struck from opposite sides thereof and projecting through slotted compressible boards contacting opposite surfaces of the body plate and contacted by the peripheral seal of the joint, said body plate having openings therein for receiving the material of said boards when the same are compressed by the expansion of the concrete road slabs.

Other and further important objects of this invention will be apparent from the disclosures in the specification and the accompanying drawing.

The invention (in a preferred form) is illustrated in the drawing and hereinafter more fully described.

On the drawing:

Figure 1 is a fragmentary side elevational view of an expansion joint with a peripheral seal and embodying the principles of this invention.

Figure 2 is an enlarged end view of the expansion joint illustrated in Figure 1.

Figure 3 is an enlarged vertical detail section taken through fragmentary portions of concrete road slabs having embedded therebetween an improved expansion joint with a peripheral seal surrounding a metal body portion having compressible side boards contacting the road slabs and engaging over anchoring members struck from the body plates.

As shown on the drawing:

The reference numeral 1 indicates a road subgrade having mounted thereon concrete road slabs 2 and 3 between which an improved expansion joint with a peripheral seal is embedded.

The expansion joint mechanism comprises a sheet metal body plate having the middle portions thereof deflected or formed to provide a transverse intermediate section or shield separating an upper plate 4 from a lower plate 5.

The transverse shield extends substantially throughout the entire length of the joint forming unit and comprises an upper looped section or channel portion 6 and a lower looped section or channel portion 7 which extend in opposite directions beyond the sides of the plates and are connected by means of a common transverse plate 8. For the purpose of anchoring the expansion joint plate members 4 and 5 in the adjacently disposed concrete road slabs 2 and 3, the top plate section 4 has struck outwardly therefrom a plurality of anchoring blades 9 which are adapted to be embedded in the concrete road slab 2. Struck outwardly in an opposite direction from the bottom expansion joint plate 5 are a plurality of anchoring blades 10 which project in a direction which permit the same to be embedded in the concrete road slab 3 as clearly illustrated in Figure 3. The formation of the anchoring blades leaves openings in the metal plates 4 and 5 for receiving material from side closure members when the same are compressed by the expansion of the road slabs.

Engaged over the top or upper channel portion 6 of the metal body, is a thin metal channel hood or cap 11, the top plate of which is provided with a flange 12 while the bottom plate projects beneath the transverse common plate 8 and into the looped section 7. As clearly illustrated in Figure 3 the looped channel cap 11 provides a chamber between the cap 11 and the looped section 6 of the shield. Engaged over the lower looped section 7 is a thin metal channel hood or cap 13, the upper plate of which extends over the top surface of the common shield plate 8 and projects into the upper looped section 6. The lower plate of the channel cap 13 projects beneath the lower looped section 7 and is provided with a flange 14. As shown in Figure 3 there is a chamber or space 15 provided within the channel cap 13 between the bight portion of the lower looped section 7 and the bight portion of the channel cap 13.

The ends of the transverse shield sections 6 and 7 as well as the ends of the caps 11 and 13 are cut off or terminate short of the side edges of the body plates 4 and 5 to leave projecting end margins on the upper and lower body plate sections 4 and 5 to engage in a peripheral seal mechanism hereinafter described.

As illustrated in Figure 1, the expansion joint mechanism extends transversely across the road sub-grade 1 from one side of the road to the other and is provided with a substantially continuous peripheral seal which extends across the top, bottom, and around both ends of the expansion joint body. The improved peripheral seal is preformed or pre-molded out of rubber or a correspondingly suitable material which is compressible and expansible. In the form of the peripheral seal illustrated it comprises a main or outer peripheral sealing strip 16 having integrally formed on the inner periphery thereof an inner peripheral sealing strip 17 which is of substantially the same thickness as the outer peripheral strip 16 and is provided with a middle or longitudinal slit or groove at 18 to permit the seal to fit over the top and end margins of the top body plate 4 and over the end margins and the bottom margin of the bottom body plate 5. Integrally formed on the opposite sides of the sealing strip 16—17 are dovetail cross-sectioned anchoring ribs or side ribs 19, which as clearly illustrated in Figure 3, are adapted to be embedded in the adjacently disposed concrete road slabs 2 and 3 on opposite sides of the joint forming mechanism.

Seated against the plain side of the upper body plate 4 and against the plain face of the lower body plate 5 are diagonally opposite compressible and expansible body boards or panels 20 which seat behind the respective flanges 12 and 14 of the channel cap members 11 and 13 respectively. The exposed edges of the body boards 20 are fitted against the inner peripheral surface of one side of the inner sealing strip 17 so that the outer faces of the body boards 20 are substantially flush with the respective sides of the peripheral seal.

Seated against the opposite faces of the upper body plate 4 and the lower body plate 5 are diagonally opposite body boards 21 constructed of a compressible and expansible material such as the material "Flexcel". The body boards 21 are wider than the boards 20 and are provided with transverse slots 22 to permit the body boards 21 to be engaged over, or under, the outwardly projecting anchoring blades 9 and 10. The exposed edges of the body boards 21 are seated against the inner peripheral surface of the inner sealing strip 17 of the peripheral seal with the outer faces of the body boards 21 substantially flush with the respective sides of the peripheral seal. The body boards 20 and 21 together with the body plates 4 and 5 form the main laminated body of the expansion joint which is divided by the longitudinally disposed transverse shield construction on which the channel caps 11 and 13 are engaged.

The continuous peripheral seal constructed of the compressible and expansible material may be formed in a single length or in joined sections and may be engaged around the peripheral margins of the expansion joint body plates 4 and 5 allowing the ends of the peripheral seal to abut one another at the top, bottom, or at any other convenient location where the abutting ends of the seal may be suitably connected or closed by means of a cap or the like.

While the anchor blades 9 and 10 of the metal body plate are struck from the respective upper and lower plate sections 4 and 5 to be embedded respectively in the concrete road slabs 2 and 3, it will of course be understood that the anchoring blades 9 and 10 may be struck out from the respective plates in an opposite direction, that is, with the upper anchoring blades 9 embedded in the concrete road slab 3 while the lower anchoring blades 10 are projected to be embedded in the concrete road slab 2. When this condition prevails, the body boards 20 are provided with either upper or lower transverse slots instead of the boards 21 in order to permit the anchoring blades to project through the boards 20.

Attention is called to the openings, shown in dotted lines in Figure 1, resulting from the punching out of the anchoring blades 9 and 10 from the metal plate sections 4 and 5. These openings serve to permit the material forming the side body boards 20 and 21 to be forced therein when the road slabs 2 and 3 expand to cause compression of the expansion joint compressible members.

In case the peripheral seal is not required, the same may be omitted. In such a case the laminated expansion joint body may have the plates and boards formed to seat directly on the road sub-grade, and the upper edges of the plates and boards may extend to within a short distance of the top surfaces of the road slabs to permit a removable edging cap to be engaged thereon.

It will, of course, be understood that various other details of construction may be varied through a wide range without departing from the principles of this invention, and it is, therefore, not the purpose to limit the patent granted hereon otherwise than necessitated by the scope of the appended claims.

I claim as my invention:

1. An expansion joint forming mechanism for embedding between concrete road slabs and comprising a body plate, means for anchoring the body plate in the concrete road slabs, body boards positioned on opposite sides of the body plates and formed to permit the anchoring means to project therethrough, and a preformed seal engaged around the entire periphery of the body plate and the body boards and partially embedded in the concrete road slabs to form a continuous seal around the entire periphery of the expansion joint forming mechanism.

2. An expansion joint forming mechanism for embedding between concrete road slabs and comprising a main metal body, anchoring members struck therefrom in opposite directions for anchoring opposite sides of the metal body to the adjacent concrete road slabs, slotted body boards engaged against opposite sides of the metal body and over the projecting anchoring members, a shield section integrally formed from the metal body and projecting transversely through the plane of said metal body, said shield section also separating portions of the body boards, metal cap members engaged over projecting portions of the shield section and embedded in the concrete road slabs, said metal cap members having plate portions thereof interfitting with the shield section to reinforce the same, and a preformed compressible and expansible peripheral seal engaged over the edges of the metal body and the body boards to form a continuous seal around the expansion joint forming mechanism.

3. The combination with an expansion joint forming unit comprising a body of alternately arranged contacting layers of compressible and non-compressible material, of a sealing means engaged on the edges thereof to provide a peripheral seal for the expansion joint forming unit, and reversed telescoping reinforcing members projecting into the body from opposite sides and enclosing parts thereof.

4. An expansion joint mechanism for embedding between concrete road slabs, said mechanism comprising in combination a metal body plate, compressible body boards engaged against opposite faces of the body plate, and a preformed slotted plastic seal engaged over the edges of the body plate and seated against the edges of the body boards to provide a continuous peripheral seal around the expansion joint mechanism, said preformed slotted seal having anchoring ribs formed on the sides thereof and embedded in the concrete road slabs.

5. An expansion joint mechanism for embedding between concrete road slabs, said mechanism comprising in combination a metal plate having the middle portion thereof folded upon itself to form a double looped transverse shield with the loops projecting from opposite sides of the plate and integrally connected by a common plate projecting through the plane of the main plate, means for anchoring diagonally opposite surfaces of the main plate in the concrete slabs on opposite sides of the joint, body boards positioned against opposite sides of the main plate and slotted to engage over the anchoring means, and a preformed compressible and expansible seal fitted over the margins of the main plate and engaged around the edges of the body boards to provide a continuous peripheral seal around the expansion joint mechanism.

6. An expansion joint mechanism for embedding between concrete road slabs, said mechanism comprising in combination a main body plate having the middle portion thereof folded upon itself to form a double looped transverse shield with the loops projecting from opposite sides of the body plate and integrally connected by a common plate projecting through the plane of the main body plate, cap members engaged over the loops of the shield and interfitting with the shield to reinforce the same, body boards disposed above and below the shield and contacting opposite sides of the metal body plate, anchoring blades struck outwardly from opposite sides of the metal body plate and projecting through the body boards to be embedded in the adjacent concrete road slabs, a preformed slotted seal engaged over the margins of the metal body plate and in contact with the edges of the body boards to form a continuous seal around the expansion joint mechanism, and means integrally formed on opposite sides of the slotted seal and embedded in the adjacent concrete road slabs.

7. In an expansion joint for embedding between adjacent concrete slabs, a body unit comprising alternate layers of compressible and non-compressible material with the non-compressible material formed to provide a transverse shield separating the upper portions of the body portion from the lower portion, means for enclosing the transverse shield and reinforcing the same, a seal engaged entirely around the periphery of the body portion of the joint, and continuous ribs integrally formed on the sides of the seal and shaped to be anchored in the adjacent concrete slabs to permit widening of the seal with the contraction of the concrete slabs due to temperature changes.

8. In an expansion joint forming mechanism the combination with a laminated body, of cap members engaged over side portions of the laminated body, and a continuous peripheral seal engaged around the laminated body.

9. In an expansion joint for embedding between adjacent concrete road slabs, a laminated body, means projecting therefrom for anchoring the laminated body in the adjacent concrete road slabs, cap members engaged on opposite sides of the laminated body for enclosing portions thereof, and continuous peripheral seals engaged entirely around the edges of the laminated body and provided with continuous rib means embedded in the adjacent road slabs.

10. In an expansion joint for embedding between adjacent concrete road slabs, a laminated body comprising a metal intermediate plate having anchoring members for embedding in the concrete slabs struck from the intermediate metal plate leaving openings in the plate, and compressible side plates engaged over the anchoring members and seated against the sides of the intermediate metal plate to close the openings therein, said compressible side plates adapted, when compressed by the expansion of the road slabs, to protrude into the metal plate openings.

ROBERT R. ROBERTSON.